US009476980B2

(12) United States Patent
Thayer et al.

(10) Patent No.: US 9,476,980 B2
(45) Date of Patent: Oct. 25, 2016

(54) REMOTE MEASUREMENT OF SHALLOW DEPTHS IN SEMI-TRANSPARENT MEDIA

(76) Inventors: Jeffrey P. Thayer, Boulder, CO (US); Steven Mitchell, Annapolis, MD (US); Matthew Hayman, Boulder, CO (US)

(*) Notice: Subject to any disclaimer, the term of this patent is extended or adjusted under 35 U.S.C. 154(b) by 327 days.

(21) Appl. No.: 14/129,925

(22) PCT Filed: Jun. 29, 2012

(86) PCT No.: PCT/US2012/045038
§ 371 (c)(1),
(2), (4) Date: Dec. 27, 2013

(87) PCT Pub. No.: WO2013/003771
PCT Pub. Date: Jan. 3, 2013

(65) Prior Publication Data
US 2014/0146303 A1    May 29, 2014

Related U.S. Application Data

(60) Provisional application No. 61/503,314, filed on Jun. 30, 2011.

(51) Int. Cl.
*G01C 3/08* (2006.01)
*G01S 17/08* (2006.01)
(Continued)

(52) U.S. Cl.
CPC ............... *G01S 17/08* (2013.01); *G01S 7/499* (2013.01); *G01S 7/497* (2013.01)

(58) Field of Classification Search
CPC ......... G01S 17/08; G01S 17/10; G01S 7/499
USPC ....................................................... 356/5.01
See application file for complete search history.

(56) References Cited

U.S. PATENT DOCUMENTS

| 4,967,270 | A |   | 10/1990 | Ulich et al. |
| 4,986,656 | A | * | 1/1991  | Sweeney ............... G01J 3/44 |
|           |   |   |         |             356/301 |

(Continued)

FOREIGN PATENT DOCUMENTS

| EP | 1391382 A2 | 2/2004 |
| EP | 2277776 A2 | 1/2011 |
| GB | 2256766    | 12/1992 |

OTHER PUBLICATIONS

Nayegandhi, Lidar Technology Overview, Jun. 2007, available at lidar.cr.usgs.gov/downloadfile2.php?file=Nayegandhi_Lidar_Technology_Overview.pdf, 66 pages.

(Continued)

*Primary Examiner* — Mark Hellner
(74) *Attorney, Agent, or Firm* — Aspire IP; Scott J. Hawranek

(57) ABSTRACT

Through discrimination of the scattered signal polarization state, a lidar system measures a distance through semi-transparent media by the reception of scattered signals from a first surface and scattered signals from a second surface. Combined and overlapped light signals scattered from the two surface signals can be separated by exploiting their differing polarization characteristics. This removes the traditional laser and detector pulse width limitations that determine the system's operational bandwidth, translating relative depth measurements into the conditions of single surface timing measurements and achieving sub-pulse width resolution.

24 Claims, 8 Drawing Sheets

(51) Int. Cl.
*G01S 7/499* (2006.01)
*G01S 7/497* (2006.01)

(56) References Cited

U.S. PATENT DOCUMENTS

| | | | |
|---|---|---|---|
| 5,157,257 A | 10/1992 | Geiger | |
| 5,243,541 A | 9/1993 | Ulich | |
| 6,654,105 B2 | 11/2003 | Wang et al. | |
| 7,580,127 B1 | 8/2009 | Mayor et al. | |
| 8,054,464 B2 * | 11/2011 | Mathur | G01N 15/0205 356/337 |
| 8,493,445 B2 * | 7/2013 | Degnan, III | G01S 7/499 348/117 |
| 2006/0231771 A1 | 10/2006 | Lee et al. | |
| 2008/0137058 A1 | 6/2008 | Cesare | |
| 2009/0073442 A1 | 3/2009 | Smith | |
| 2010/0025589 A1 | 2/2010 | Olcott et al. | |

OTHER PUBLICATIONS

International Search Report for International (PCT) Application No. PCT/US12/45038, mailed Sep. 26, 2012.
Written Opinion for International (PCT) Application No. PCT/US12/45038, mailed Sep. 26, 2012, 17 pages.
International Preliminary Report on Patentability for International (PCT) Application No. PCT/US12/45038, mailed Jan. 7, 2014, 18 pages.
Extended European Search Report for European Patent Application No. 12804262.9, dated Oct. 9, 2014, 7 pages.

\* cited by examiner

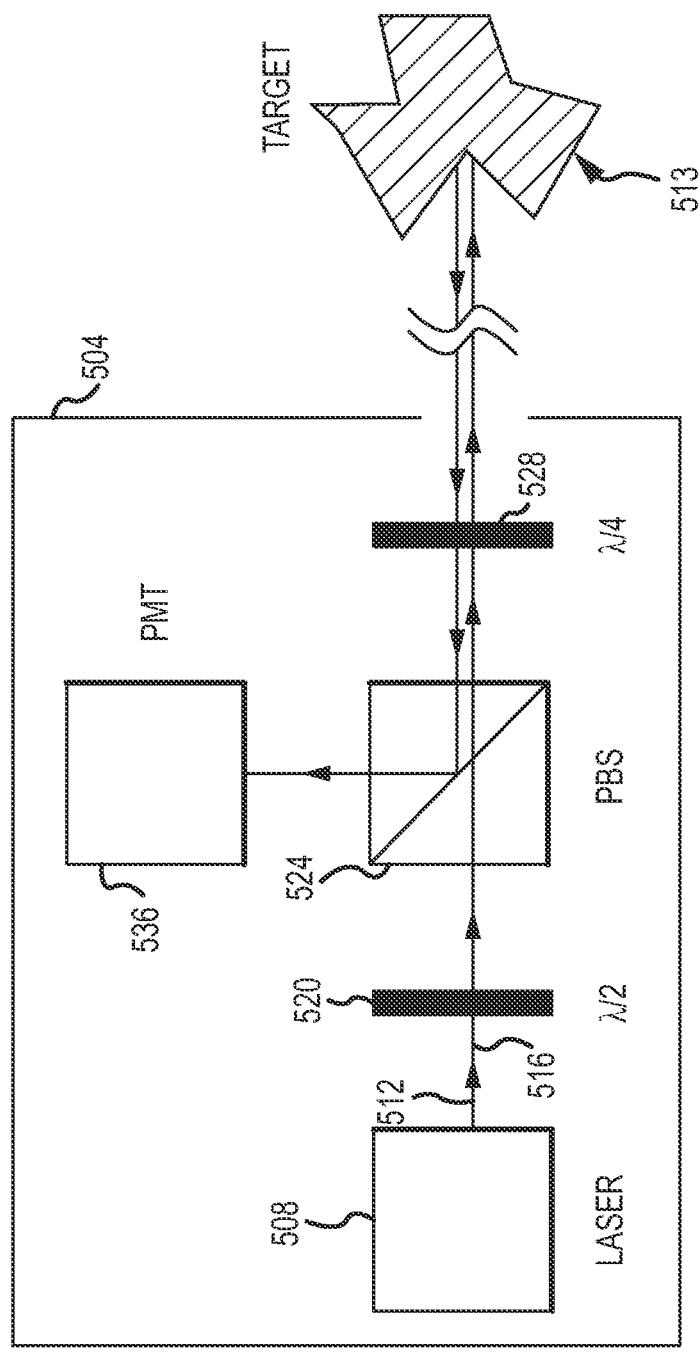

REMOTE MEASUREMENT OF SHALLOW DEPTHS IN SEMI-TRANSPARENT MEDIA

The present application is the National Stage of International Application No. PCT/US2012/045038, filed Jun. 29, 2012, which claims the benefits of and priority, under 35 U.S.C. §119(e) to U.S. Provisional Application Ser. No. 61/503,314 filed Jun. 30, 2011 entitled "WATER DEPTH RETRIEVAL AND UNDERWATER MAPPING SYSTEM", each of the aforementioned documents are incorporated herein by this reference in their entirety for all that it teaches and for all purposes.

FIELD

This invention is directed generally to methods and systems for remote measurement of shallow depths in semi-transparent media, and particularly to methods and systems for measurement of the relative distance between surfaces of differing polarization properties.

BACKGROUND

Light detection and ranging (lidar) bathymetry is a technique capable of measuring the depth of a relatively shallow body of water (e.g., less than 2 meters). A pulsed laser beam is transmitted from the lidar instrument to the body of water. The light generated by the laser beam is typically in the blue-green portion of the spectrum due to the high transmission through water of light at that wavelength. Portions of the laser pulse scatter from the air/water interface, the water volume, and the floor of the water body back to and are collected by the instrument. The times of flight of the detected signals are converted into range measurements and, upon consideration of viewing geometry, propagation paths, and associated errors, permit determination of the probed water depth.

Depth measurement in the shallow water regime is challenging due to system bandwidth limitations of traditional bathymetric lidar techniques. The shallow water limit of current lidar technologies occurs where ambiguities exist between surface scatterings, volume scattering along the water column, and floor scattering due to system bandwidth limitations associated with laser and/or detector pulse widths. As a result, present day bathymetry lidar systems are limited to depth measurements no shallower than tens of centimeters.

There is a need in the art to improve the precision and other aspects of bathymetry lidar systems.

SUMMARY

Accordingly, the invention is directed to methods and systems for remote measurement of shallow depths in semi-transparent media that substantially obviate one or more of the problems due to limitations and disadvantages of the prior art.

An advantage of the invention is to provide enhanced range resolution and precise measurement in shallow water depth measurement and water floor topography mapping. Further, the invention has capabilities and applications in semi-transparent media thickness measurement and surface topography characterization.

Another advantage is to allow distance sampling with no physical contact with the media.

Yet another advantage is providing a low cost, accurate, self-calibrating, and scalable solution with a differential measurement requiring no knowledge of the lidar system's platform position.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a lidar system includes a transmitter configured to output polarized light to a target, a receiver configured to collect scattered light from the target, a first detector, a second detector, the first detector and the second detector are configured to receive at least a respective portion of the scattered light from the receiver, and timing electronics coupled to each of the first and second detectors.

In another aspect of the present invention, a lidar system includes a light transmitter configured to transmit a light signal, a light receiver configured to receive a scattered light signal, the scattered light signal includes a first component and a second component, and a detector configured to resolve the first and second components of the scattered light signal.

In yet another aspect of the present invention, a lidar system includes a source of polarized light and a light receiver, the light receiver configured to receive scattered light. The light receiver includes a polarizing beam splitter, the polarizing beam splitter splits the scattered light into a cross-planar polarization component and a co-planar polarization component. The lidar system further includes a first detector, the first detector is configured to receive the cross-planar polarized component, and a second detector, the second detector is configured to receive the co-planar polarized component.

In further yet another aspect of the present invention, a method of measuring a relative distance between a first surface and a second surface with differing polarization characteristics, the method includes the steps of generating polarized light, scattering at least some of the polarized light from the first surface and at least some of the polarized light from the second surface, receiving the scattered light, splitting the scattered light into a first and second component, the first and second component having a relative difference in polarization, detecting the first and second component, determining an amount of time elapsed between the first and second component, and calculating a relative distance between the first surface and the second surface based on the amount of time elapsed.

In another aspect of the present invention, a lidar system includes a laser light source, an output of the laser light source is laser light. The lidar system further includes a polarizing beam splitter, the laser light is aligned with the transmission axis of the polarizing beam splitter, and an output of the polarizing beam splitter is linearly polarized light. The lidar system further includes a quarter-wave plate, the linearly polarized light transmitted by the polarizing beam splitter is received at the quarter-wave plate. In a first mode of operation, the fast or slow axis of the quarter-wave plate is oriented 45-degrees to the linearly polarized light output of the polarizing beam splitter, circularly polarized light is emitted by the quarter-wave plate. In a second mode of operation, the quarter-wave plate is oriented such that fast and slow axes of the quarter-wave plate are aligned with the linear polarized light output of the polarizing beam splitter, linearly polarized light is emitted by the quarter-wave plate. The lidar system further includes a detector, light reflected by the polarizing beam splitter is received at the detector.

In yet another aspect of the present invention, a lidar system includes a source of light and a variable wave plate. In a first mode of operation, the variable wave plate is configured to output light polarized in a first direction, and in a second mode of operation, the variable wave plate is configured to output light polarized in a second direction relatively different than the first direction. The lidar system further includes a detector, the detector is configured to receive scattered light of the output polarized light.

In further yet another aspect of the present invention, a method of measuring a relative distance between surfaces includes measuring a relative distance to a polarization preserving surface, which includes generating linearly polarized light at a first time, the generated light is vertically polarized, circularly polarizing the vertically polarized light in a first direction, and scattering at least some of the light circularly polarized in a first direction from the polarization preserving surface. The scattered light is circularly polarized in a second direction after being scattered by the polarization preserving surface. Measuring the relative distance between surfaces further includes linearly polarizing the scattered light, and passing the linearly polarized light to a detector. The light is received at the detector at a second time. Measuring the relative distance between surfaces further includes determining an amount of time elapsed between the first time and the second time to obtain a first time difference, and measuring a relative distance to a polarization-altering surface. Measuring a relative distance to the polarization-altering surface includes generating linearly polarized light at a third time, the generated light is vertically polarized, passing at least a first portion of the vertically polarized light through the polarization preserving surface to the polarization-altering surface, a second portion of the vertically polarized light is scattered by the polarization preserving surface as vertically polarized light, scattering the linearly polarized light passed through the polarization preserving surface from the polarization-altering surface, the linearly polarized light is altered after being scattered by the polarization-altering surface, passing a horizontally polarized component of the polarization-altered scattered light to a detector, the light is received at the detector at a fourth time, light scattered by the polarization preserving surface is not passed to the detector, determining an amount of time elapsed between the third time and the fourth time to obtain a second time difference, using the first and second time differences, and calculating a relative distance between the polarization preserving surface and the polarization-altering surface.

In another aspect of the present invention, a method of measuring relative distance between a first surface and a second surface with different polarization characteristics includes generating light, scattering the light respectively from the first surface and the second surface, receiving each of the scattered light from the first surface and the second surface, detecting the scattered light, and determining an amount of time elapsed between the light scattered from the first surface and the light scattered from the second surface.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 depicts components of a lidar system in accordance with an embodiment of the present invention;

DETAILED DESCRIPTION

Figure 1:
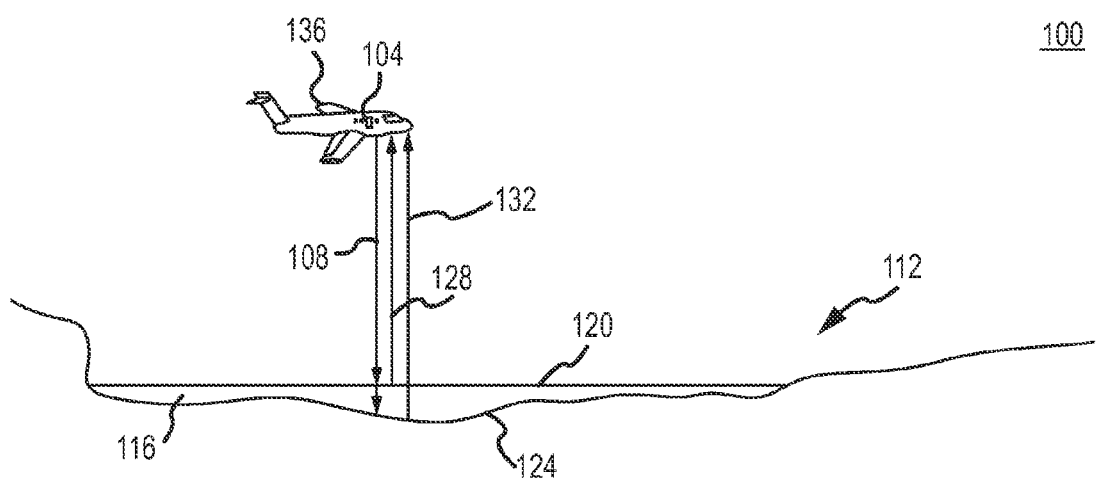
FIG. 1 illustrates a lidar system in accordance with embodiments of the present invention, in an exemplary operating environment.

The invention relates to a lidar system. A lidar system is configured to measure the distance or other properties of a target surface by illuminating the target surface with light. In one embodiment, the lidar system of the present invention is configured to measure shallow depths of semi-transparent media. Media includes a first surface and a second surface and the body of the media in-between the first and second surfaces. In a vertical orientation, the first and second surfaces of the media may be the top and bottom surfaces, respectively. Light transmitted is partially scattered from and partially refracted into the top surface of semi-transparent media. The bottom surface may include a relatively opaque or polarization-altering media or a second semi-transparent media. The top surface and the body of semi-transparent media include but are not limited to media such as water or glass. The bottom surface that is relatively opaque or polarization-altering includes but is not limited to media such as ice, sand, rock, wall, skin, hypodermis, cells, other anatomical regions, and/or combinations of the same.

In one embodiment, the lidar system includes a transmitter configured to output polarized light to a target, a receiver configured to collect scattered light from the target, and first and second detectors. The first and second detectors are configured to receive at least a respective portion of the scattered light from the receiver. The first and second detectors may be configured to detect the respective portions of the scattered light and substantially the same time or with some offset. The system also includes timing electronics coupled to each of the first and second detectors.

The transmitter used in the invention may include transmitters that generate and transmit a light with a known polarization. The transmitter may include a laser and a polarizer in optical communication with the laser. The transmitter may further include a half-wave plate in optical communication with the laser. The laser may include at least one of a polarized laser, a pulsed laser, or a continuous wave (CW) laser. In one specific example, a transmitter includes a Teem Photonics 35 mW laser with a 450 ps pulse width with optics that generates and transmits linearly polarized light with degree of polarization greater than 99.9.

The receiver may include one or more receivers that can receive scattered light. The receiver may include a telescope. The receiver may optionally include one or more components for filtering processes (i.e. a spectral filter) and may further include a polarizing splitter. In one specific example, a receiver includes an Orion Maksutov-Cassegrain telescope with a 90 mm aperture and a 1250 mm effective focal length.

The first and second detectors include detectors that can detect and count photons in a light signal. The detectors may include photomultiplier tubes that output a photon count signal. Other detectors that may operate in photon counting or analog mode include avalanche photodiodes, charge coupled devices, or other photon detectors. In one specific example, the detectors include Hamamatsu H7422PA-40 photomultiplier tubes with a 2.5 ns pulse width.

Timing electronics includes electronics that can calculate a relative distance based on an amount of time elapsed between light signals. Timing electronics may include a constant fraction discriminator (CFD) to discriminate an apex in a photon count signal, a time-to-digital converter (TDC), and a processor. In one specific example, timing electronics include a SensL CFD with an 8 ns output pulse width and a SensL HRMTime TDC with a 27 ps bin width and a 190 ns dead time.

In another embodiment, a lidar system includes a light transmitter configured to transmit a light signal, a light receiver configured to receive a scattered light signal, the scattered light signal includes first and second components, and a detector configured to resolve the first and second components of the scattered light signal.

A light signal includes electromagnetic radiation carrying information. Information includes distinguishing attributes of the light signal such as the amplitude, frequency, phase, polarization, other attributes, and/or combinations of the same. The light signal may be coded by natural (i.e., light containing a polarization signature of the target scattered from a linearly polarized incident light) or artificial means (i.e., coding embedded by electronics when a light is generated). In addition, the polarization may be any type of polarization (e.g., linearly, vertical, horizontal, and/or circular). A light signal may be any type of signal (e.g., pulsed or continuous wave (CW) laser, lamp, LED light, and/or other light sources or combinations of the same). Pulsed light signals may have demarcations in the null signal between the pulses; CW light signals may have demarcations where the wave changes modulation, phase, and/or other attributes. A light signal may include component signals with varying attributes occupying at least a portion of substantially the same and/or indistinguishable time and/or space as the light signal.

The scattered light signal includes the specular and diffuse light scattered from the targeted medium. A scattered light signal includes a directed light signal changing direction as a result of the directed light signal hitting a surface. The surface could include polarization preserving or polarization-altering surfaces. The scattered light signal may have a different intensity, frequency, phase, polarization, other attributes, and/or combinations of the same, due to the characteristics of the directed light signal interacting with the surface. Further, when the directed light signal hits a polarization-altering surface, the scattered light signal may scatter significantly to various polarizations and/or directions. A reflected light signal includes the specular light scattered from a target medium. A reflected light signal may further refer to the action of optical components within a transmitter and receiver of an instrument that directs a light signal from one element to another.

A component signal of a light signal includes at least some uniform distinguishing attribute such as amplitude, frequency, phase, polarization, other attributes, and/or combination of the same. In one specific example, the co-planar polarization and the cross-planar polarization of a light signal are two components of a light signal.

In yet another embodiment, a lidar system includes a source of polarized light and a light receiver, the light receiver configured to receive scattered light. The light receiver includes a polarizing beam splitter. The polarizing beam splitter splits the scattered light into a cross-planar polarization component and a co-planar polarization component. The lidar system further includes a first detector and a second detector. The first detector is configured to receive the cross-planar polarized component. The second detector is configured to receive the co-planar polarized component.

In further yet another embodiment, a method of measuring a relative distance between a first surface and a second surface with differing polarization characteristics. The method includes the steps of generating polarized light, scattering at least some of the polarized light from the first surface and at least some of the polarized light from the second surface, receiving the scattered light, and splitting the scattered light into a first and second component. The first and second component have a relative difference in polarization. The method further includes the steps of detecting the first and second component, determining an amount of time elapsed between the first and second component, and calculating a relative distance between the first surface and the second surface based on the amount of time elapsed.

In another embodiment, a lidar system includes a laser light source, an output of the laser light source is laser light. The lidar system further includes a polarizing beam splitter, the laser light is aligned with the transmission axis of the polarizing beam splitter, and an output of the polarizing beam splitter is linearly polarized light. The lidar system further includes a quarter-wave plate, the linearly polarized light transmitted by the polarizing beam splitter is received at the quarter-wave plate. In a first mode of operation, the fast or slow axis of the quarter-wave plate is oriented 45-degrees to the linearly polarized light output of the polarizing beam splitter, circularly polarized light is emitted by the quarter-wave plate. In a second mode of operation, the quarter-wave plate is oriented such that fast and slow axis of the quarter-wave plate are aligned with the linear polarized light output of the polarizing beam splitter, linearly polarized light is emitted by the quarter-wave plate. The lidar system further includes a detector. Light scattered by the polarizing beam splitter is received at the detector.

In yet another embodiment, a lidar system includes a source of light and a variable wave plate. In a first mode of operation, the variable wave plate is configured to output light polarized in a first direction, and in a second mode of operation, the variable wave plate is configured to output light polarized in a second direction relatively different than the first direction. The lidar system further includes a detector. The detector is configured to receive scattered light of the polarized light.

In further yet another embodiment, a method of measuring a relative distance between surfaces includes measuring a relative distance to a polarization preserving surface, which includes generating linearly polarized light at a first time, the generated light is vertically polarized, circularly polarizing the vertically polarized light in a first direction, and scattering at least some of the light circularly polarized in a first direction from the polarization preserving surface. The scattered light is circularly polarized in a second direction after being scattered by the polarization preserving surface. Measuring the relative distance between surfaces further includes linearly polarizing the scattered light, and passing the linearly polarized light to a detector. The light is received at the detector at a second time. Measuring the relative distance between surfaces further includes determining an amount of time elapsed between the first time and the second time to obtain a first time difference, and measuring a relative distance to a polarization-altering surface. Measuring a relative distance to the polarization-altering surface includes generating linearly polarized light at a third time, the generated light is vertically polarized, passing at least a first portion of the vertically polarized light through the polarization preserving surface to the polarization-altering surface, a second portion of the vertically polarized light is scattered by the polarization preserving surface as vertically polarized light, scattering the linearly polarized light passed through the polarization preserving surface from the polarization-altering surface, the linearly polarized light is altered after being scattered by the polarization-altering surface, passing a horizontally polarized component of the polarization-altered scattered light to a detector, the light is received at the detector at a fourth time, light scattered by the polarization preserving surface is not passed to the detector, determining an amount of time elapsed between the third time and the fourth time to obtain a second time difference, using the first and second time differences, and calculating a relative distance between the polarization preserving surface and the polarization-altering surface.

In another embodiment, a method of measuring relative distance between a first surface and a second surface with different polarization characteristics includes generating light, scattering the light respectively from the first surface and the second surface, receiving each of the scattered light from the first surface and the second surface, detecting the scattered light, and determining an amount of time elapsed between the light scattered from the first surface and the light scattered from the second surface.

Reference will now be made in detail to an embodiment of the present invention, examples of which are illustrated in the accompanying drawings.

FIG. 1 illustrates a lidar system 104 in accordance with embodiments of the present invention, in an exemplary operating environment 100. The lidar system 104 generates transmitted light 108 that is directed towards a target 112. The target 112 may comprise a body of water 116 having a top surface 120 and a floor 124. In a first mode of operation, light 128 scattered from the surface 120 of the target 112 is received by the lidar system 104. The time elapsed between the generation of a pulse of light 108 scattered from the surface 120 of the target 112 and returned to the lidar system 104 as a scattered signal 128 is used to determine a relative distance between the surface 120 of the target 112 and the lidar system 104. In a second mode of operation, the time elapsed between the generation of a pulse of transmitted light 108 and a signal 132 scattered from the floor 124 of the target 112 is used to determine the relative distance between the lidar system 104 and the floor 124 of the target 112. By taking the difference between the distance to the surface 120 and the distance to the floor 124, the relative distance between the surface 120 and the floor 124 can be determined. Accordingly, the relative depth of the water 116 can be determined. In the example of FIG. 1, the lidar system 104 is associated with a platform 136 comprising an airplane. However, a lidar system 104 in accordance with embodiments of the present invention may be associated with different platforms 136. Examples of suitable platforms 136, in addition to an airplane, include satellites, unmanned aerial vehicles, helicopters, balloons, boats, or other platforms. In addition, a lidar system 104 in accordance with embodiments of the present invention is not limited to shallow water bathymetry. For example, the lidar system 104 can be used for bottom surface mapping, or for determining the distance between any polarization preserving surface that is at least partially transmissive of light 108, and a polarization-altering surface behind the polarization preserving surface, particularly in the instance where the separation distance would be otherwise unresolvable due to system bandwidth limitations associated with laser and/or detector pulse widths. The polarization-altering surface includes but is not limited to media such as ice, sand, rock, wall, skin, hypodermis, cell, other anatomical regions, and combinations of the same.

Figure 2A:
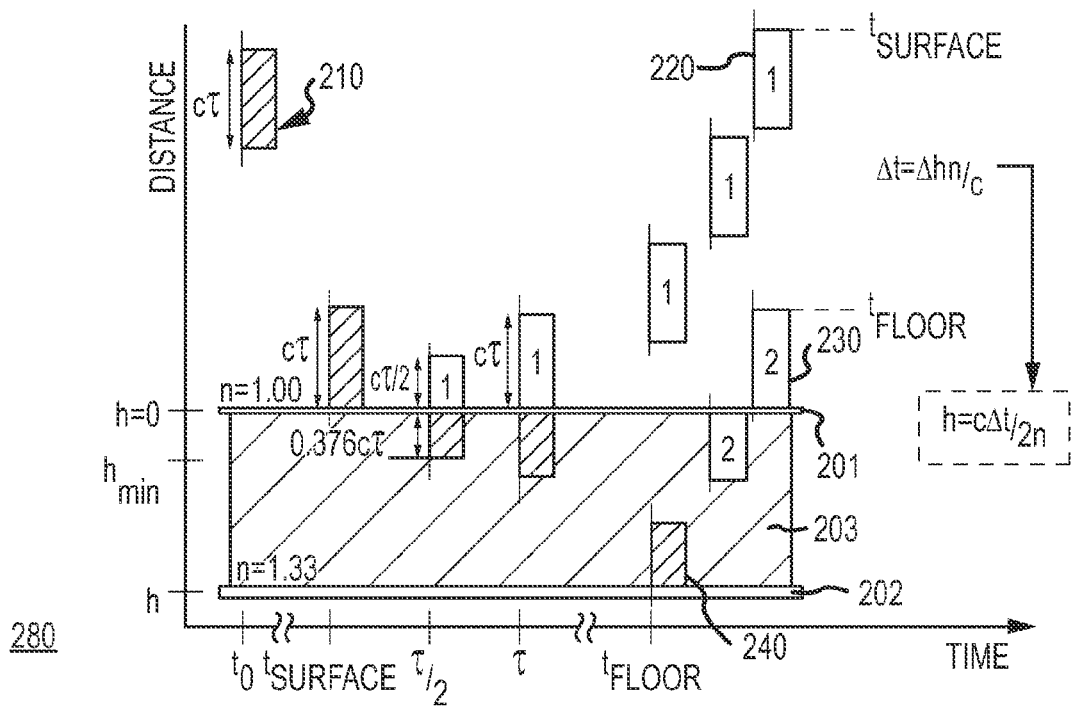
FIG. 2A and FIG. 2B illustrate detection of scattered light pulse over time for a system with pulse width resolution.
Figure 2B:
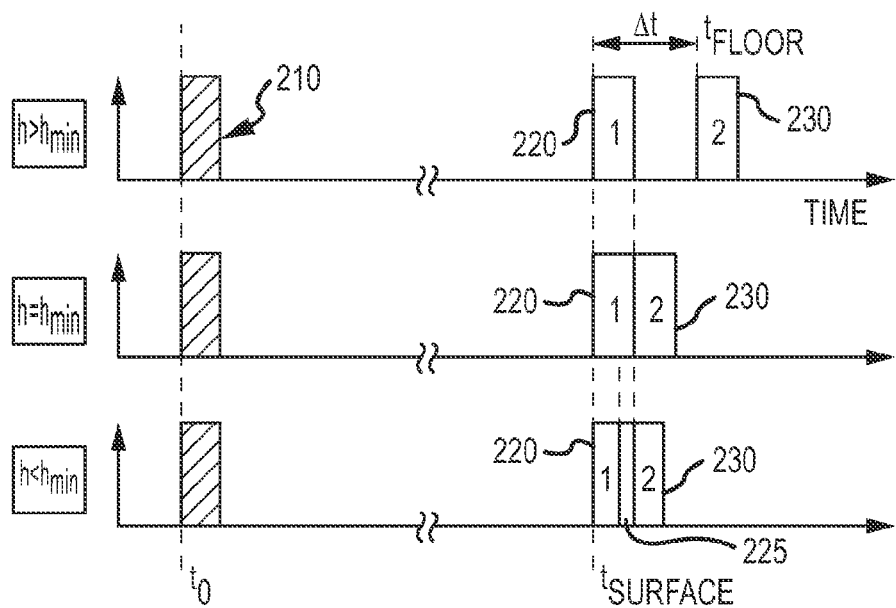

FIG. 2A and FIG. 2B illustrate detection of scattered light pulse over time for a system with pulse width resolution.

FIG. 2A depicts an exemplary shallow water environment 280 with shallow water body 203 having water surface 201 and water floor 202. The y-axis represents the distance of a vertical cross-section of shallow water environment 280. The x-axis represents time. The level of water surface 201 is at distance h=0; the level of water floor 202 is at distance h. Water body 203 with a water medium has a refractive index of n=1.33. Air medium above water surface 201 has a refractive index of n=1.

Transmitted (Tx) pulse 210 is a light pulse having a length $c\tau$. At time $t_0$, Tx pulse 210 is generated by a lidar system such as lidar system 104 or by other light sources. In environment 280, Tx pulse 210 is being transmitted substantially normal to water surface 201. However, Tx pulse 210 may be transmitted at other angles as long as Tx pulse 210 can be at least partially scattered from and partially refracted through water surface 201.

At time $t_{surface}$, Tx pulse 210 arrives at water surface 201. As stated, Tx pulse 210 will be partially scattered off water surface 201, the scattered light pulse being received (Rx) pulse 220, and partially refracted through water surface 201 into water body 203, the refracted light pulse being refracted pulse 240. Thus, at time $\tau/2$, half of Tx pulse 210 has been scattered as Rx pulse 220 with length $c\tau/2$, and half of Tx pulse 210 has been refracted as refracted pulse 240 with length $0.376c\tau$ (due to the refraction index in water body 203). At time $\tau$, Tx pulse 210 has been fully either scattered as Rx pulse 220 or refracted as refracted pulse 240.

At time $t_{floor}$, refracted pulse 240 reaches water floor 202 and will be at least partially scattered as Rx pulse 230. Rx pulse 230, like refracted pulse 240, will have a comparatively shortened length when traveling in water body 203 because of the refractive index of water body 203 (n=1.33) as opposed to air (n=1). Rx pulse 230 will lengthen to length $c\tau$ when it exits the water surface 201.

Thus, when Rx pulse 230 exits water surface 201, the time difference between $t_{floor}$ and $t_{surface}$ can be derived from the time difference between Rx pulse 220 and Rx pulse 230. Further, the relationship between the time difference of $t_{floor}$ and $t_{surface}$ and the physical distance between water surface 201 (h=0) and water floor 202 (h) is given by $$h = \frac{c\Delta t}{2n} \quad (1)$$

Therefore, the depth of water body 203 can be determined

FIG. 2B depicts timings diagrams for Rx pulses 220 and 230 for specific water depth scenarios. When the distance between water surface 201 and water floor 202 (h) is greater than a minimum depth of water ($h_{min}$) for which half of Rx pulse 220 has scattered from water surface 201 (h>$h_{min}$), a discernible gap exists between Rx pulses 220 and 230, and timing difference between Rx pulses 220 and 230 ($\Delta t$) is $t_{floor}-t_{surface}$. When the distance between water surface 201 and water floor 202 (h) is equal to $h_{min}$, Rx pulse 230 comes directly after Rx 220 with no discernible gap and no overlapped portions between Rx pulses 220 and 230. When the distance between water surface 201 and water floor 202 (h) is less than $h_{min}$ (h<$h_{min}$), Rx pulse 230 comes before the entire portion of Rx pulse 220 has progressed, creating an ambiguous intrapulse overlap 225.

Therefore, there is a limitation to the detection method as described in FIG. 2A and FIG. 2B. This limitation is that the scattered pulses Rx pulse 220 and Rx pulse 230 must be substantially separable. That is, Rx pulse 230 must not start to exit water surface 201 before Rx pulse 220 has been completely scattered from water floor 201. Effectively, this requirement requires a minimum depth of water ($h_{min}$) for which Rx pulse 230 cannot scatter from water floor 202 before half of Rx pulse 220 has scattered from water surface 201 at time $\tau/2$. In this embodiment, $h_{min}$ is 0.376c$\tau$ (due to the refraction index in water body 203 as discussed previously) and depends on the length of Tx pulse 210.

When h<$h_{min}$, the two scattered pulses, Rx pulse 220 and 230, have an ambiguous intrapulse overlap 225 that is not separable for resolving the time difference between $t_{floor}$ and $t_{surface}$ from Rx pulses 220 and 230. In practice, $h_{min}$ is limited by equipment limitations for generating and detecting light pulses with minimal length $\tau$.

Figure 2C:
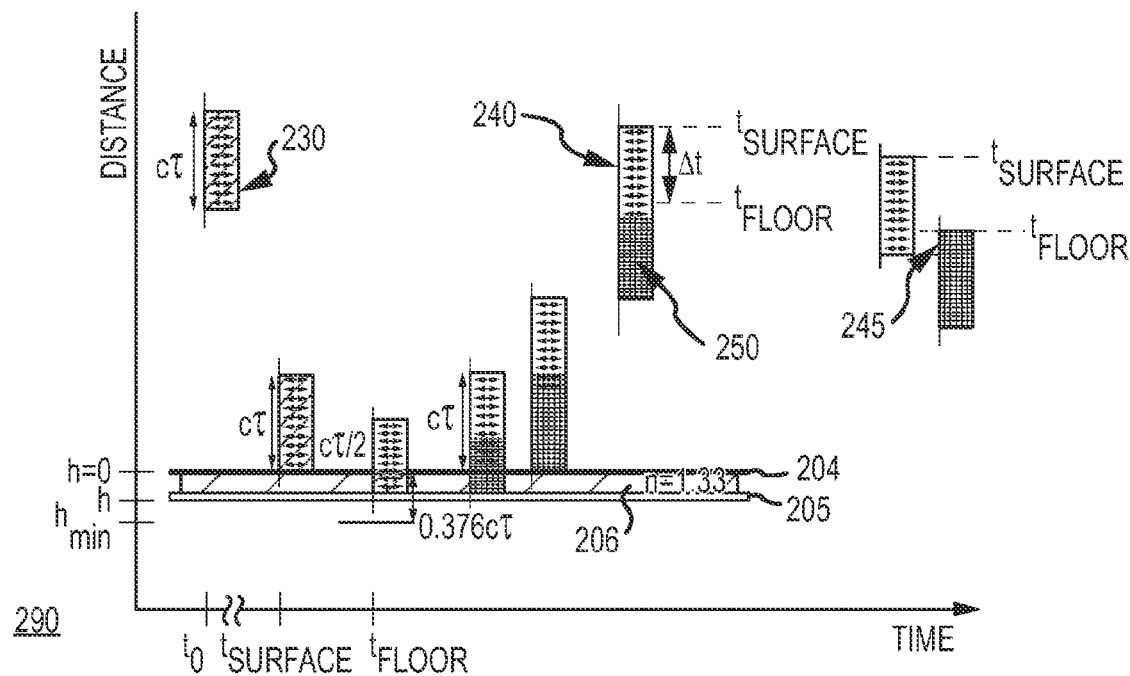
FIG. 2C and FIG. 2D illustrate detection of scattered light pulse over time for a system with sub-pulse width resolution in accordance with an embodiment of the present invention.
Figure 2D:
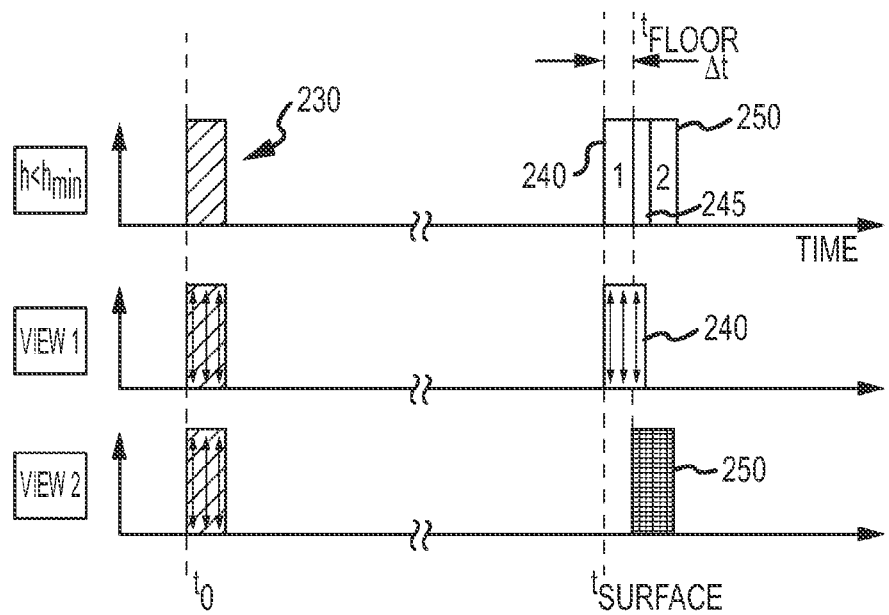

FIG. 2C and FIG. 2D illustrate detection of scattered light pulse over time for a system with sub-pulse width resolution in accordance with an embodiment of the present invention.

Referring to FIG. 2C, an exemplary shallow water environment is depicted as reference number 290. The environment 290 includes a shallow water body 206 having water surface 204 and water floor 205. The y-axis represents the distance of a vertical cross-section of shallow water environment 290. The x-axis represents time. The level of water surface 204 is at distance h=0, and the level of water floor is at distance h. The depth of water body 206 is at distance h, which is less than the minimum depth of water ($h_{min}$) for Tx pulse 230. Therefore, an Rx pulse 240 that is scattered from water surface 204 and an Rx pulse 250 that is scattered from water floor 205 includes an ambiguous intrapulse overlap portion 245. Ambiguous intrapulse overlap 245 is created similarly to ambiguous intrapulse overlap 225 as described with respect to FIG. 2A and FIG. 2B.

In this embodiment, Tx pulse 230 is a light pulse having a known polarization. For example, Tx pulse 230 is polarized in the cross-planar direction to the propagation vector of Tx pulse 230, which is normal to water surface 204 when in direct nadir viewing. Tx pulse 230 can be polarized by a lidar system, such as lidar system 104, or by other polarizing light sources as known in the art. As Tx pulse 230 arrives at water surface 204 at time $t_{surface}$, Tx pulse 230 is partially scattered by water surface 204 as Rx pulse 240. Since water surface 204 is a polarization preserving surface, Rx pulse 240 keeps substantially the same polarization as Tx pulse 230. Tx pulse 230 is also partially refracted into water body 206. The refracted portion of Tx pulse 230 is scattered by water floor 205 at time $t_{floor}$. Water floor 205 is a polarization-altering surface and creates polarization scattering in the scattered light. Therefore, Rx pulse 250 will have a different polarization from Tx pulse 230 and Rx pulse 240 when scattered from water floor 205.

FIG. 2D depicts timings diagrams for Rx pulses 240 and 250 for water depth of h<$h_{min}$. Scattered pulses Rx pulse 240 and Rx pulse 250 will have an overlap 245 because of h<$h_{min}$. Referring to views 1 and 2, in this embodiment, the ambiguous intrapulse overlap 245 can be removed and Rx pulses 240 and 250 can be separated as two distinct signals because Rx pulse 240 has only the cross-planar polarization being scattered from water surface 204, and Rx pulse 250 has a range of polarization due to the backscattering from being scattered from water floor 205. This separation may be achieved by various mechanical (i.e., mechanically movable mirrors), optical (i.e., prisms or splitting polarizers), electronic means (i.e., photon counting detectors), and/or combination of the same.

While FIGS. 2A-2D were discussed with respect to one transmitted polarized light pulse according to an embodiment of the invention, other configurations can be used. For example, instead of pulsed light, continuous wave (CW) laser can also be used (i.e., where gaps between each "pulse" can be similarly obtained by modification of phase induced by scattering). Further, two or more transmitted light pulses with different polarizations can also be used in place of or in complement to the one cross-planar polarized light. For example, according to one embodiment of the invention as discussed with reference to FIG. 5, two light pulses can be transmitted each having a different polarization such that, after filtering, one pulse will gather signal only from the polarization preserving surface and one pulse will gather signal only from the polarization-altering surface. In this configuration, only one detector is required to count both light pulses. Still further, polarizations that are in alignment with the transmitted pulse (i.e., co-planar and cross-planar polarization) are preferred but are not required. Other polarization angles can be used and may be better suited for other applications (i.e., surfaces positioned at an angle or surfaces made up of other materials such as ice).

Figure 3:
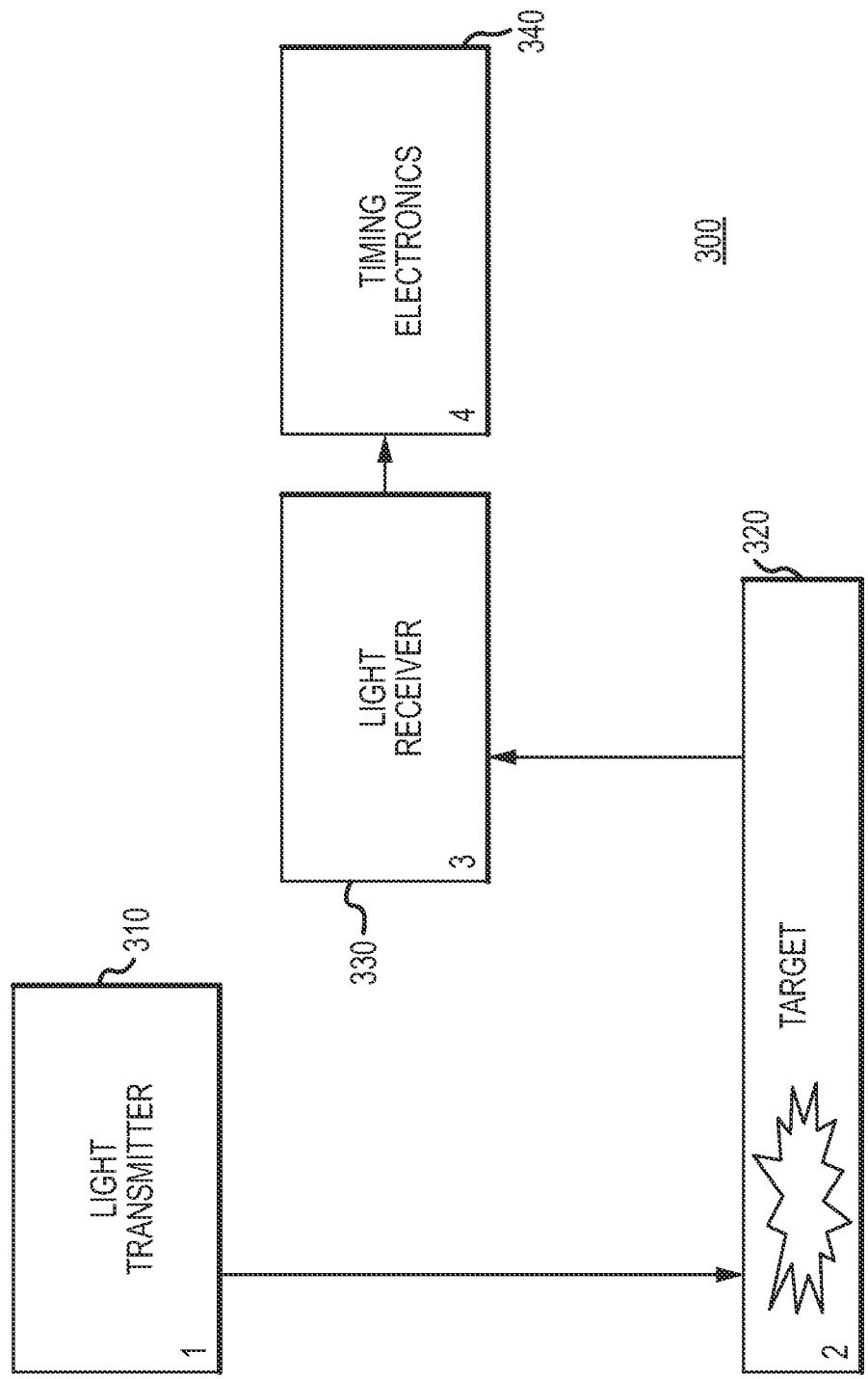
FIG. 3 illustrates a lidar system in accordance with an embodiment of the present invention.

FIG. 3 illustrates a lidar system according to an embodiment of the invention.

Referring to FIG. 3, lidar system is generally depicted as reference number 300. The lidar system 300 includes a light transmitter 310, light receiver 330, and timing electronics 340. The light transmitter 310 is configured to generate and output at least one light signal (e.g., pulsed or continuous wave (CW) laser). In a preferred embodiment, the outputted light signal has a known polarization. Target 320 is a shallow water body or any other type of body with a respective relatively polarization preserving and semi-transparent surface (first surface) and a relatively polarization-altering (e.g., opaque and/or depolarization) surface (second surface). The outputted light signal from light transmitter 310 is configured to scatter from both the first and second surfaces. Light receiver 330 is configured to receive the scattered light signals from target 320 and separate the scattered light signals into their respective components. Timing electronics 340 is electrically coupled to light receiver 330 and is configured to calculate a relative distance based on an amount of time elapsed between light signals.

Figure 4:
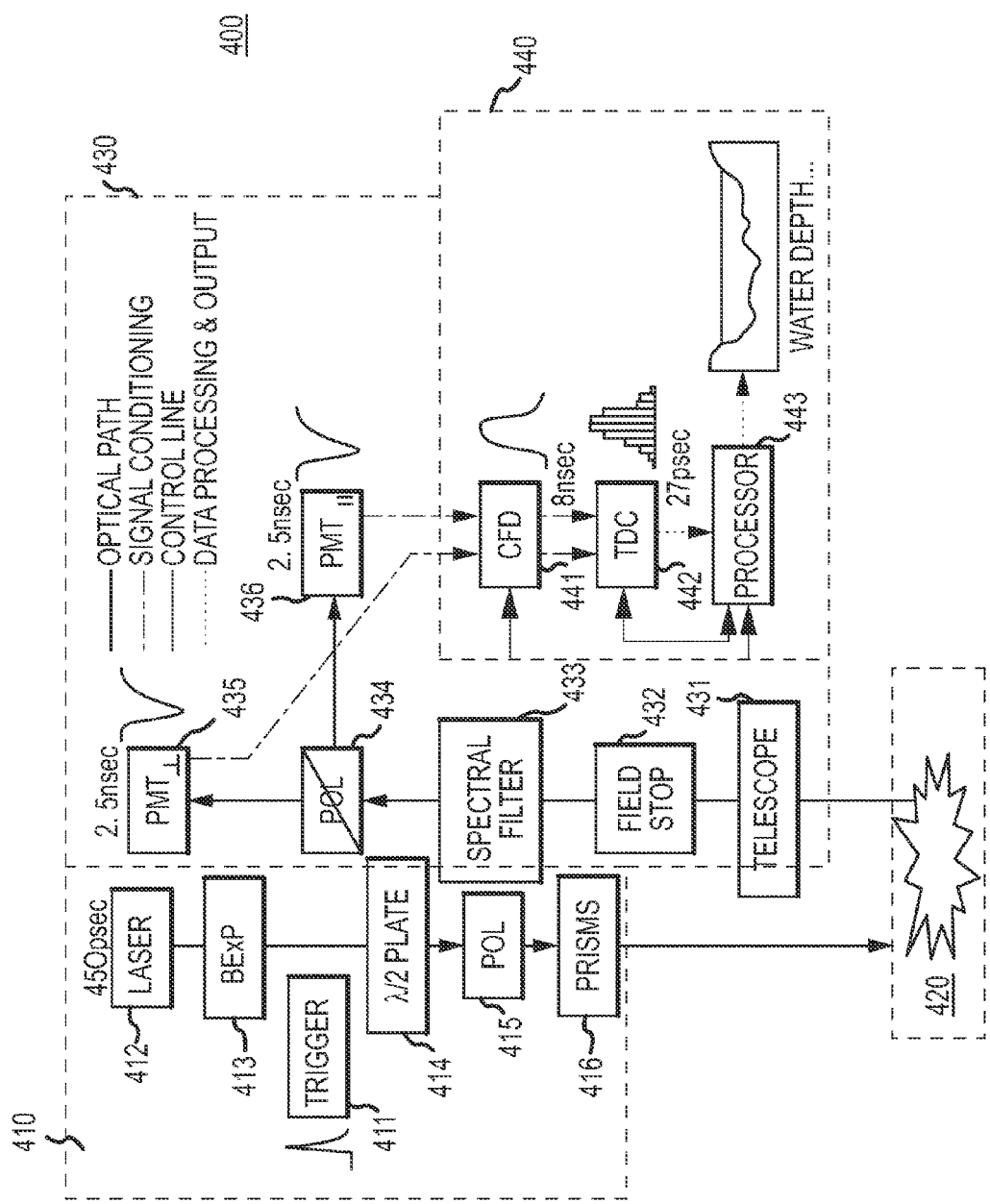
FIG. 4 depicts components of a lidar system in accordance with an embodiment of the present invention.

FIG. 4 illustrates components of a lidar system according to an embodiment of the invention.

Referring to FIG. 4, the lidar system 400 includes light transmitter 410, light receiver 430, and timing electronics 440. In this embodiment, the light transmitter 410 includes laser 412, beam expander 413, half-wave plate 414, polarizer 415, and prisms 416. Laser 412 acts as a light source for lidar system 400 and is configured to emit a focused light as the basis of the transmitted light signal. Laser 412 can be a pulsed laser, continuous wave (CW) laser, polarized laser, or other types of lasers. In other embodiments, laser 412 can generically include other light sources as known in the art (i.e., lamp or LED light). In one embodiment, a 450 ps pulsed laser is used as laser 412. Beam expander 413, half-wave plate 414, polarizer 415, and prisms 416 are optional and are configured to focus and align the transmitted light signal towards target 420. In this embodiment, the chain of beam expander 413, half-wave plate 414, polarizer 415, and prisms 416 are each aggregated and aligned to the optical path of the transmitted light signal. Beam expander 413 is configured to expand the transmitted light signal for tight spot targets. Half-wave plate 414 may be mechanically or electrically (i.e., using a liquid crystal variable retarder) operable to control the retardance of the focused light signal along the optical path. Polarizer 415 is configured to polarize the light signal with a known polarization. A polarizing laser may also be used as laser 412 for a known polarization. Prisms 416 are configured to coaxially direct and focus the transmitted light signal to target 420 as known in the art.

In operation, trigger 411 may be electrically coupled to laser 412 or other components of light transmitter 410 to start the transmission of the light signal. In other embodiments, light transmitter 410 may operate continuously without trigger 411. Light signal is transmitted from light transmitter 410 to target 420. Target 420 includes at least a first surface and a second surface as described herein. The transmitted light signal is partially scattered from the first surface as a first scattered light signal and partially refracted into the target. The refracted light is scattered from the second surface as a second scattered light.

The first scattered light signal has substantially the same polarization as the transmitted light signal while the second scattered light signal will have a different polarization due to the scattering from the second surface. The first and second scattered light signals may have an overlapped intrapulse portion forming one combined scattered light signal.

Light receiver 430 includes telescope 431, field stop 432, spectral filter 433, splitting polarizer 434, first detector 435, and second detector 436. Each of these components are aggregated and aligned to an optical path of the scattered light signal. Telescope 431 acts to collect the scattered light signal. Field stop 432 and spectral filter 433 are optional components. Field stop 432 acts to limit the field of view of light receiver 430 where the scattered light signal would be gathered. Spectral filter 433 acts to further filter the received light to the light spectrum of interest (i.e., limiting the spectrum to the expected frequency of the scattered light signals).

Splitting polarizer 434 acts to separate the received scattered light signal according to the polarization. In this embodiment, the polarization splitter 434 is aligned with the optical path of the scattered light signal. As scattered light signal reaches polarization splitter 434, the cross-planar polarized component of the signal substantially passes through polarization splitter 434 while the co-planar polarized component of the signal substantially reflects. The angle of reflection is a function of the type of polarizer used (i.e. 90° angle or 62° angle for a Glan Taylor polarizer). Here, the first scattered light signal scattered from the water surface containing cross-planar polarized light is substantially reflected (i.e., at a 90° angle) while at least the co-planar polarization component of the second scattered light signal scattered from the water floor containing depolarized light is substantially transmitted. Other orientations are also possible depending on the polarization methodology used on the transmitted light signal and the type of polarizer used for polarization splitter 434.

Detector 435 is positioned at a 180° optical path from the reflected light signal and configured to detect the cross-planar polarization component of scattered light signal. Detector 436 is positioned at the optical path of the reflected light signal (i.e., 90°) and is configured to detect the co-planar component of the scattered light signal. As such detector 436 is configured to detect the first scattered signal from the water surface while detector 435 is configured to detect the second scattered signal from the water floor. Detectors 435 and 436 may be photomultiplier tubes and are configured to count the volume of photons in each signal within a certain time interval representing the strength of the signal and output a photon count signal. In one embodiment, detectors 435 and 436 have 2.5 ns resolution. Moreover, the detectors 435 and 436 can be configured to substantially simultaneously detect separated scattered signals from the polarizing beam splitter 434.

It is noted that polarizing beam splitter 434 can be positioned at a variety of angles to split the scattered light signal at other angles. Detectors 435 and 436 can be positioned at other configurations to receive such split components of the scattered light signal.

The timing electronics 440 may include a constant fraction discriminator (CFD) 441, time-to-digital converter (TDC) 442, and processor 443. Processor 443 is coupled to CFD 441 and TDC 442 through a control line for control and feedback of these components. CFD 441 is coupled to detectors 435 and 436 through a signal conditioning line and is configured to output an apex of the photon count signal at certain intervals representing the time at which the signal has meaningfully arrived. In one embodiment of the invention, CFD 441 has an 8 ns resolution. TDC 443 is coupled to CFD 441 and is configured to convert the time signal output by CFD 441 into a digital signal. In one embodiment of the invention, TDC 442 has a resolution of 27 ps.

Processor 443 is coupled to TDC 442 and is configured to take the digitized timing signal and determine the time of arrival of each component (co-planar and cross-planar polarized signals in one embodiment) and calculate the difference in the time of arrival of the two signals. In this embodiment, the processor 443 is further configured to transform the time difference into the depth between the polarization preserving and polarization-altering surfaces depending on the calibration of the lidar system 400 and the refraction index of shallow water body or other types of bodies in question. Further description of this calculation will be described with respect to FIG. 5.

Further, an initial calibration to lidar system 400 may be needed because the light paths to detectors 435 and 436 may not be the same after the scattered light is separated by polarizing splitting 434. According to one embodiment, this calibration can be accomplished by using a scattered signal from a surface that is depolarizing and noting a difference in the assessment of distance to that surface between the detectors 435 and 436. The difference in the assessment of distance is likely due to the slightly different optical paths between each of detectors 435 and 436 and polarizing splitter 434. In one embodiment, this calibration can be performed once and saved for adjustment by processor 443. The correction and adjustment can be applied to subsequent depth data by processor 443.

FIG. 5 illustrates components of a lidar system in accordance with embodiments of the present invention.

Referring to FIG. 5, the lidar system 504 includes an optical bench or other structure, to which other components may be directly or indirectly connected. These components include a light source (e.g., pulsed or CW laser) or laser 508. The laser 508 may be operated to generate linearly polarized light 512 that is transmitted along an optical axis 516. As an example, the linearly polarized light 512 may have a wavelength of 532 nm. A half-wave plate 520 can be included along the optical axis 516. The half-wave plate 520 may be rotated about the optical axis 516, at least during a calibration stage, to control the orientation of the linearly polarized light 512 about the optical axis 516.

A polarizing beam splitter (PBS) 524, such as a polarizing beam splitter cube, is located along the optical axis 516. Where required to maximize transmission, the linearly polarized light 512 can be rotated about the optical axis 516 by the half-wave plate 520, such that the light 512 is aligned with the transmission axis of the PBS 524, enabling the maximum amount of linearly polarized light 512 to pass through the PBS 524.

A quarter-wave plate 528 is located along the optical axis 516 such that the linearly polarized light 512 transmitted by the PBS 524 is passed through the quarter-wave plate 528. In addition, the quarter-wave plate 528 is free to rotate about the optical axis 516. As will be described in greater detail elsewhere herein, the quarter-wave plate 528 may be rotated between a first orientation, in which the quarter-wave plate 528 acts to circularly polarize the light 512 received from the polarizing beam splitter, and a second orientation, in which the quarter-wave plate 528 is aligned so as to maintain the linear polarization state of the light 512 received from the polarizing beam splitter 224. As an alternative, an electronically controlled variable wave plate may be used in place of the quarter-wave plate 528.

A detector 536 is located to receive light scattered from a target 513 back through the quarter-wave plate 528, and that is in turn reflected by the PBS 524. The detector 536 may, for example, comprise a photomultiplier tube, an avalanche photodiode, a charge coupled device, or other light detector.

In a first mode of operation, the fast axis of the quarter-wave plate 528 is oriented 45° to the linear polarization output of the PBS 524. In this orientation, the quarter-wave plate 528 retards the linear slow polarization component of the light 512 transmitted from the laser 508 through the PBS 524 relative to the fast polarization component of that light 512 by 90°, resulting in the emission of light towards the target 513 that is circularly polarized in a first direction. The surface of a target 513 comprising a body of water is polarization preserving. Accordingly, the circularly polarized light is scattered back to the lidar 504 in the opposite circular polarization state. For example, where the light 508 transmitted to the target 513 is left hand circularly polarized, the light scattered from the surface of the target 513 will be right hand circularly polarized. The light scattered back to the lidar system 504 is retarded again by the quarter-wave plate 528. The result is linearly polarized light that is rotated about the optical axis 516 by 90° as compared to the light 512 that originally exited the PBS 524. For example, where the light 512 exiting the PBS 524 was vertically polarized, the light scattered by the polarization preserving surface will be horizontally polarized after again passing through the quarter-wave plate 528. Accordingly, the scattered light is aligned with the reflection axis of the PBS 524, and is directed by the PBS 524 to the detector 536. Accordingly, a light pulse comprising scattering from the surface of the target 513 is delivered to the detector 536.

In the second mode of operation, the quarter-wave plate 528 is rotated such that the fast and slow axes are aligned with the transmission plane of the PBS 524. The vertical polarization components of the transmitted light are thus retarded equally by the quarter-wave plate 528. As a result, linearly (e.g., vertically) polarized light is transmitted to the target 513. Because the surface and the water column of a target 513 comprising a body of water are polarization preserving, the linear polarization state of the incident light is preserved. When scattered back to the lidar system 504, this linearly polarized light is passed through the quarter-wave plate 528 unmodified, as linearly (e.g., vertically) polarized light that is then transmitted by the PBS 524 back toward the laser 508. Accordingly, the light scattered by the surface or the water column of the target 513 is not delivered to the detector 536. However, the floor of the target 513 alters the polarization of the transmitted linearly polarized light upon scattering. This polarization-altering effect is due to attributes such as the rough typography of a typical floor of a body of water. The polarization-altered light scattered back to the lidar system 504 by the floor of the target 513 is not altered by the quarter-wave plate 528. Accordingly, half of the light scattered from the floor of the target 513 is reflected by the PBS 524 to the detector 536 for detection. The other half of the light is transmitted through the PBS 524 back toward the laser 508. As a result, in this second mode of operation, the lidar system 504 only passes light scattered from the floor of the target 513 to the detector 536. This facilitates the detection of the floor, even in connection with targets 513 comprising shallow (e.g., less than 10 cm) bodies of water, since the earlier return from the surface and column of the body of water is passed through the PBS 524 back toward the laser 508, and therefore is not directed to the detector 536.

The scattering surface that is measured in shallow water bathymetry using a lidar system 504 in accordance with embodiments of the present invention is dictated by the orientation of the rotating quarter-wave plate 528 and subsequent modulation of transmitted and received polarization states. An analytical description of the technique begins by defining the associated Stokes vector of the transmitted linearly polarized laser pulse 512, $S_{Tx}$, not limited to but for the purposes of demonstration here is oriented to an angle θ of π/4 radians about the optical axis out of the laser transmission face.

$$S_{Tx} = \begin{bmatrix} 1 \\ 0 \\ 1 \\ 0 \end{bmatrix} \quad (2)$$

The half-wave plate 520 used to rotate the linearly polarized laser 508 light 512 into alignment with the transmission axis of the PBS 524 is expressed as a variable wave plate with phase shift γ of π radians, oriented to rotate the linearly polarized laser 508 light 512 to the transmission axis of the PBS 524. For the manifestation of the technique described here, the half-wave plate 520 is oriented to an angle θ of π/8 radians about the optical axis. The resulting Mueller matrix for the half-wave plate is defined as $$VWP = \begin{bmatrix} 1 & 0 & 0 & 0 \\ 0 & \cos(2\theta) & -\sin(2\theta) & 0 \\ 0 & \sin(2\theta) & \cos(2\theta) & 0 \\ 0 & 0 & 0 & 1 \end{bmatrix} \begin{bmatrix} 1 & 0 & 0 & 0 \\ 0 & 1 & 0 & 0 \\ 0 & 0 & \cos(\gamma) & \sin(\gamma) \\ 0 & 0 & -\sin(\gamma) & \cos(\gamma) \end{bmatrix} \quad (3)$$

$$\begin{bmatrix} 1 & 0 & 0 & 0 \\ 0 & \cos(-2\theta) & -\sin(-2\theta) & 0 \\ 0 & \sin(-2\theta) & \cos(-2\theta) & 0 \\ 0 & 0 & 0 & 1 \end{bmatrix}$$

The PBS 524 is modeled as a polarizer oriented to an angle θ of 0 radians for transmission along the vertical axis in the instrument transmitter, and oriented to θ of π/2 radians for horizontal transmission in the receiver.

$$Pol = \begin{bmatrix} 1 & 0 & 0 & 0 \\ 0 & \cos(2\theta) & -\sin(2\theta) & 0 \\ 0 & \sin(2\theta) & \cos(2\theta) & 0 \\ 0 & 0 & 0 & 1 \end{bmatrix} \begin{bmatrix} 0.5 & 0.5 & 0 & 0 \\ 0.5 & 0.5 & 0 & 0 \\ 0 & 0 & 0 & 0 \\ 0 & 0 & 0 & 0 \end{bmatrix} \quad (4)$$

$$\begin{bmatrix} 1 & 0 & 0 & 0 \\ 0 & \cos(-2\theta) & -\sin(-2\theta) & 0 \\ 0 & \sin(-2\theta) & \cos(-2\theta) & 0 \\ 0 & 0 & 0 & 1 \end{bmatrix}$$

During acquisition of bathymetric measurements, the quarter-wave plate 528 is initially oriented to θ of π/4 radians for transmission of circularly polarized light towards the target 513 and then rotated to θ of 0 radians for transmission of linear polarization. The quarter-wave plate 528 is expressed in terms of the variable wave plate Mueller matrix of (3), with phase shift γ of π/2 radians. As experienced along the return path of scattered signals, the quarter-wave plate 528 is expressed with orientation θ of −π/4 radians for reception of circularly polarized light and θ of 0 radians for reception of polarization-altered signals.

An example, normalized Mueller matrix that describes the scatter produced by the target 513 water body incorporates a d term which ranges from 0 to 1 and describes the target's ability to alter the polarization state (depolarize) of the incident laser pulse polarization. In this sense, a d value of 0 corresponds to a polarization preserving target such as the water surface, while a d value of 1 defines a completely depolarizing target such as a rough floor topography.

$$MDep_d = \begin{bmatrix} 1 & 0 & 0 & 0 \\ 0 & 1-d & 0 & 0 \\ 0 & 0 & d-1 & 0 \\ 0 & 0 & 0 & 2d-1 \end{bmatrix} \quad (5)$$

Combining the transmitted Stokes vector in (2) with the appropriate Mueller matrices described in (3)-(5) produces the received Stokes vector $$S_{Rx} = [VWP_{Tx}^{\lambda/2} \cdot Pol_{Tx} \cdot VWP_{Tx}^{\lambda/4} \cdot MDep_d \cdot VWP_{Rx}^{\lambda/4} \cdot Pol_{Rx}] S_{Tx} \quad (6)$$

the intensity of which, as measured by the detector 236, is defined as $$I_{Rx} = [1\ 0\ 0\ 0] S_{Rx} \quad (7)$$

EXAMPLES

Without intending to limit the scope of the invention, the following examples illustrate how various embodiments of the invention may be made and/or used.

Example 1

Figure 6A:
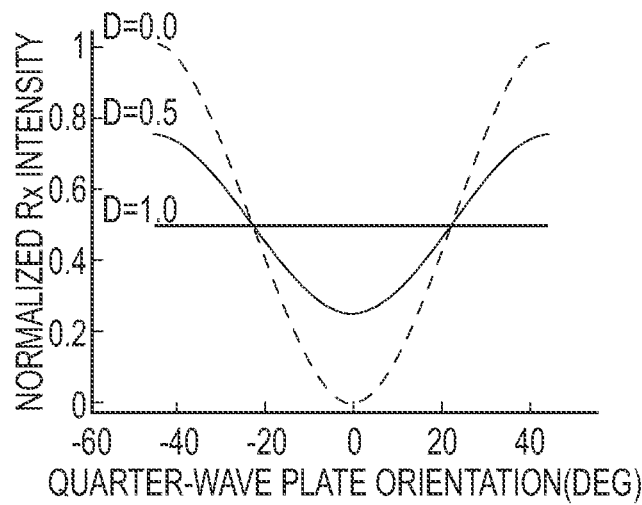
FIG. 6A illustrates the normalized received intensity of light for targets of varying degrees of depolarization.

A simulation of the normalized received intensity for targets of varying degrees of depolarization d is illustrated in FIG. 6A. The sinusoidal nature of received light from a polarization preserving target 512 (curve labeled d=0) is evident, while the detector 536 registers a constant intensity of 0.5 for a completely depolarizing target 512 (curve labeled d=1). By translating the quarter-wave plate 528 from an orientation θ of π/4 radians to θ of 0 radians, scattered signals are modulated between polarized water surface and volume of the water body returns and depolarized floor returns.

Bathymetric measurements were made at the University of Colorado, Boulder, using a lidar system 504 as illustrated in FIG. 5. The transmitter consisted of a CW-diode pumped, passively Q-switched Nd:YAG microchip laser. The laser outputs 2.45 microjoule of linearly polarized 532 nm light at a repetition rate of 14 kilohertz and pulse width of 450 picoseconds. A half-wave plate aligned the laser 508 light polarization to the vertical transmission plane of a 532 nm PBS. Light exiting the PBS was transmitted through a rotatable quarter-wave plate toward a controlled target consisting of a column of water on top of a polarization-altering floor substrate. Scattered laser light received by the instrument was collected with a detector comprising a photomultiplier tube in photon counting mode. The output PMT voltage was analyzed on an oscilloscope with 550 ps timing resolution and stored for post-processing.

Figure 6B:
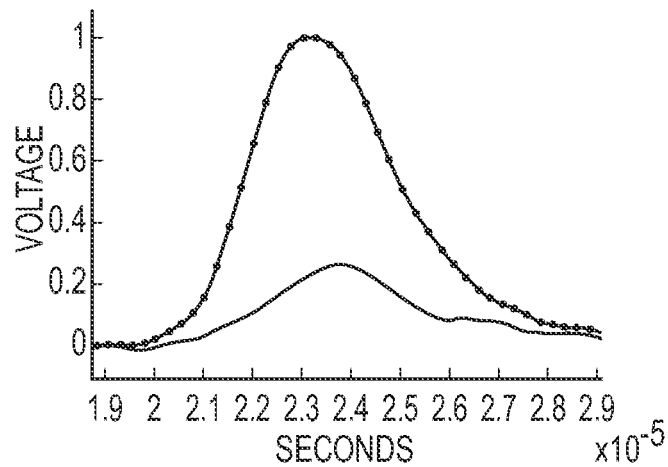
FIG. 6B illustrates normalized detector voltage data acquired during the reception of backscattered signals using an analog system for the water surface (dotted) and floor (solid)

Data acquired during reception of scattered signals from the target for 3 centimeter deep water as measured physically, are presented in FIG. 6B. The quarter-wave plate was positioned in θ orientations of π/4 and 0 radians. The received intensity from the PMT analog signal illustrates reduction of polarized signals from the water (dotted-solid) when the quarter-wave plate fast axis is aligned to the vertical PBS polarization transmission plane to measure polarization-altered floor signals (solid).

Figure 6C:
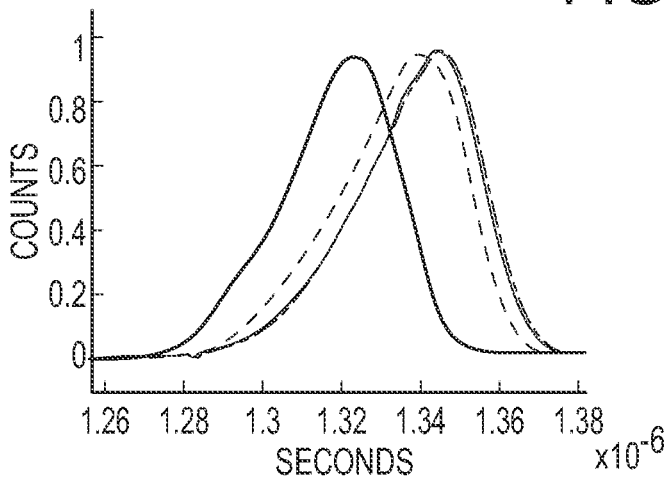
FIG. 6C illustrates normalized timing data acquired during the reception of scattered surface and floor signals using a digital system for 3 centimeter water depth (solid) and 1 centimeter water depth (dashed)

The experiment was repeated using a digital lidar receiver with 27 picosecond timing resolution, as illustrated in FIG. 6C. To illustrate the ultimate resolution of the timing unit, data were again taken for 3 centimeter (solid) and 1 centimeter (dashed) water depths.

Taking into account the refractive index change of water n relative to air, water depth h is calculated as:

$$h = \frac{c\Delta t}{2n} \quad (8)$$

where the time delay Δt is evaluated by differencing the FWHM points (horizontal dashed) of the surface and floor curve trailing edges. The results presented in FIG. 6C produced depth measurements d of 2.7 cm and 1.2 cm. The 27 ps resolution of the timing unit imposes a ±3 mm uncertainty on the water depth estimate. Therefore, the observed depths are well within the uncertainty of the measurement.

Transmission of vertically polarized light through the PBS and translation of the quarter-wave plate orientation modulates received signals between polarization preserving water surface and body returns and polarization-altered floor scatter. By removing water surface and column effects through polarization modulation, bathymetric ambiguities between water surface and body floor returns are negated. As a result, the fundamental lower limit on shallow water bathymetry imposed by system bandwidth limitations is reduced beyond traditional techniques using a single detection channel. The technique presented here has demonstrated resolution of 1 cm water depth.

Although embodiments described above discuss the inclusion of a light source comprising a laser, it should be appreciated that the light source is not required to comprise a laser. Moreover, transmission and reception of light may be through separate apertures. According to such embodiments, a polarizing beam splitter need not be included. For example, the reception channel can instead include a filter or other polarization discrimination element. Moreover, although examples have discussed the transmission of light having particular polarizations, other polarizations can be used. In particular, it is sufficient to transmit polarized light, and receive polarization-altered light for discriminating polarization preserving and polarization-altering scattered light. In addition, although methods and systems herein have discussed the disclosed polarization techniques in connection with lidar, embodiments of the present invention also have application to guided wave optics, optical time domain reflectometry, fiber optic sensor networks, and/or other applications as known now or may be later derived.

Example 2

Figure 7:
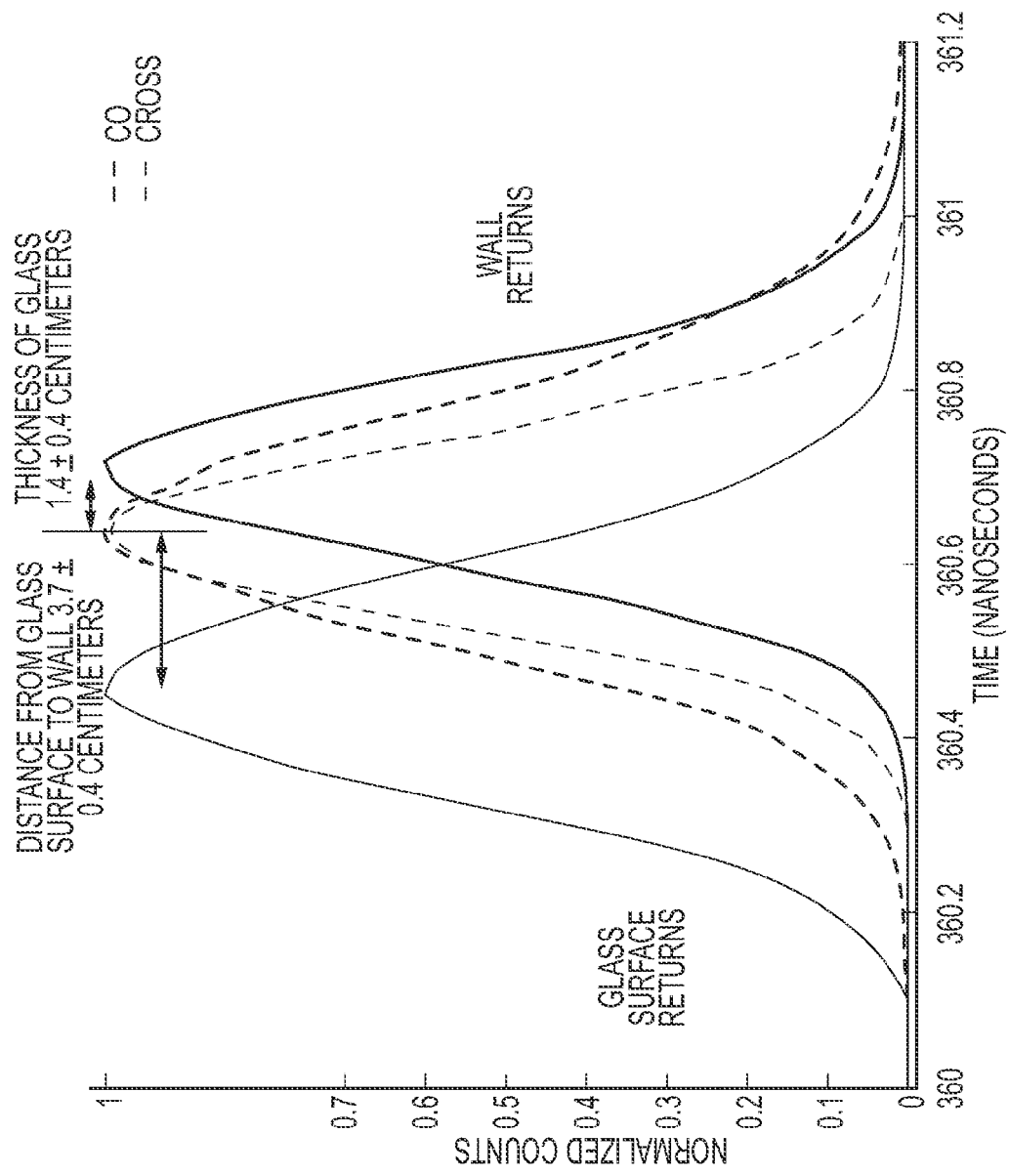
FIG. 7 illustrates the measurement of depth of semi-transparent media with sub-pulse width resolution.

FIG. 7 illustrates the result of an experimental setup measuring depth of semi-transparent media with sub-pulse width resolution. Here, a laser pulse width of 450 ps was used, corresponding to a pulse length (range) of 6.75 cm. A piece of glass with polarization preserving and semi-transparent surfaces and with a thickness of 0.95 cm was placed in front of a polarization-altering (depolarizing) wall at a distance of 2.4 cm. A lidar system, similar to lidar system 400 according to one embodiment of the invention, was placed at a distance of 30 m from the media.

First, a control measurement was made with the piece of glass removed. The dotted lines in the graph show the relative distance of the wall from this control measurement. Both the co-planar and cross-planar polarization components in this measurement are scattered from the wall and register the same distance after being calibrated (dotted lines).

Next, a measurement is made with the glass setup as described. The solid lines in the graph show the relative distance of the glass and the wall from this measurement. The co-planar polarization component is scattered from the glass surface. The cross-planar polarization component is produced by scattering from the wall. The distance from the glass surface to the wall can then be determined based on previous embodiments of the invention. Further, in this measurement, the cross-planar polarization component scattered from the wall is further delayed by the refraction index of the glass. Therefore, a measurement on the thickness of the glass can also be determined by this delay in this second measurement.

Both the distance from the glass surface to the wall and the thickness of the glass can be determined using both the measurements from the control experiment and with the glass setup. For the distance of the glass first surface to the wall, since the cross-planar polarization component is scattered off the glass surface in the experiment with the glass setup, the distance is the difference between the wall measurements in the control experiment and the cross-planar polarization component in the experiment with the glass setup. The calculated distance is 3.7 cm±0.4 cm (actual measured distance from wall to first glass surface is 3.4 cm±0.1 cm). For the thickness of the glass, since the co-planar polarization component is scattered off the wall in the experiment with the glass setup and further includes the delay by the refraction index of the glass, the thickness is the difference between the wall measurements in the control experiment and the co-planar polarization component in the experiment with the glass setup. The calculated thickness is 1.4 cm±0.4 cm. Comparing the result of the calculated distance (3.7 cm) and thickness (1.4 cm) with the pulse width of the laser (6.75 cm), both the distance and the thickness measurements are confirmed to be at sub-pulse width.

Accordingly, the present invention has been described with some degree of particularity directed to the exemplary embodiments of the present invention. It should be appreciated though that modifications or changes may be made to the exemplary embodiments of the present invention without departing from the inventive concepts contained herein.

What is claimed is:

1. A lidar system, comprising:
   a transmitter configured to output a pulse of polarized light to a target, the transmitter comprising a laser and a polarizer in optical communication with the laser;
   a receiver configured to collect scattered light from the target, wherein the scattered light comprises a received pulse;
   a first detector;
   a second detector, wherein the first detector and second detector are each configured to receive at least a respective component of the received pulse of the scattered light from the receiver; and
   timing electronics coupled to each of the first detector and the second detector, wherein an output of the timing electronics comprises a value indicative of a relative distance based on an amount of time elapsed between inner portions of the received pulse of the scattered light, thereby achieving a sub-pulse width resolution, optionally wherein the value is based on an optical separation of respective component portions of the scattered light.

2. The lidar system of claim 1, wherein the transmitter further comprises a half-wave plate in optical communication with the laser.

3. The lidar system of claim 1, wherein the transmitter further comprises a prism in optical communication with the laser.

4. The lidar system of claim 1, wherein the laser comprises at least one of a polarized laser, pulsed laser, and a continuous wave (CW) laser.

5. The lidar system of claim 1, wherein the polarized light comprises a known polarization.

6. The lidar system of claim 1, wherein the polarized light comprises circular polarization.

7. The lidar system of claim 1, wherein the receiver comprises a telescope.

8. The lidar system of claim 7, wherein the receiver further comprises a spectral filter.

9. The lidar system of claim 7, further comprising a polarizing splitter, wherein the first detector and the second detector are in optical communication with the polarizing splitter.

10. The lidar system of claim 7, wherein the respective component of the received pulse of the scattered light comprises a cross-planar polarization component and a co-planar polarization component.

11. The lidar system of claim 10, wherein the first detector is calibrated to receive the cross-planar component and the second detector is calibrated to receive the co-planar component.

12. The lidar system of claim 7, wherein the first detector and the second detector are each calibrated to the respective portion of the scattered light.

13. A lidar system, comprising:
a source of polarized light configured to output a pulse of polarized light;
a light receiver configured to receive scattered light comprising a received pulse, the light receiver comprising a polarizing beam splitter, wherein the polarizing beam splitter is configured to split the received pulse into a cross-planar polarization component and a co-planar polarization component;
a first detector, wherein the first detector is configured to receive the cross-planar polarization component;
a second detector, wherein the second detector is configured to receive the co-planar polarization component;
timing electronics coupled in electrical communication with the first detector and the second detector configured to output a value indicative of a relative distance based on an amount of time elapsed between inner portions of the received pulse of the scattered light, thereby achieving a sub-pulse width resolution.

14. The lidar system of claim 13, wherein the source of polarized light comprises:
a laser;
a half-wave plate; and
a polarizer.

15. The lidar system of claim 14, wherein the laser is selected from the group consisting of a polarized laser, pulsed laser, and continuous wave (CW) laser.

16. The lidar system of claim 13, wherein the first detector and the second detector each comprises a photomultiplier tube, the photomultiplier tube counts photons in the cross-planar polarization component and the co-planar polarization component, respectively.

17. A method of measuring a relative distance between a first surface and a second surface with differing polarization characteristics, comprising the steps of:
generating a pulse of polarized light;
scattering at least some portion of the pulse of polarized light from the first surface and at least some portion of the pulse of polarized light from the second surface;
receiving the scattered light from the first surface as a received first surface pulse and receiving the scattered light from the second surface as a received second surface pulse, wherein the received first surface pulse and the received second surface pulse have a portion that overlaps in an ambiguous intrapulse overlap portion;
separating the received first surface pulse and the received second surface pulse into a first component and a second component, the first component and the second component having a relative difference in polarization between each other, wherein the separation removes the ambiguous intrapulse overlap;
determining an amount of time elapsed between the first component and the second component; and
calculating a relative distance between the first surface and the second surface based on the amount of time elapsed, thereby achieving a sub-pulse width resolution.

18. The method of claim 17, wherein the first surface comprises a relatively polarization preserving surface and the second surface comprises a relatively polarization altering surface.

19. The method of claim 18, wherein the first surface is a water surface and the second surface is a surface beneath the water, the first surface and the second surface are different surfaces.

20. The method of claim 17, wherein the generating a pulse of polarized light step comprises the steps of:
generating a light pulse with a laser; and
passing the light pulse through a polarizer.

21. The method of claim 17, wherein the first component is a co-planar polarization component of the scattered light and the second component is a cross-planar component of the scattered light.

22. The method of claim 21, wherein the co-planar component of the scattered light comprises substantially the scattered light from the relatively polarization preserving surface and the cross-planar polarization component of the scattered light comprises substantially the scattered light from the relatively polarization-altering surface.

23. The method of claim 17, wherein the receiving the scattered light step comprises the step of collecting the scattered light through a telescope.

24. The method of claim 22, wherein the separating the scattered light step comprises the steps of passing the scattered light through a polarizing beam splitter, wherein the cross-planar polarization component is transmitted substantially normal to the polarizing beam splitter and the co-planar component is reflected substantially perpendicular to the polarizing beam splitter.

* * * * *